D. S. McAFEE.
PROCESS OF RECOVERING THE ALKALI USED IN PULP DIGESTION.
APPLICATION FILED AUG. 16, 1918.
1,308,184.
Patented July 1, 1919.
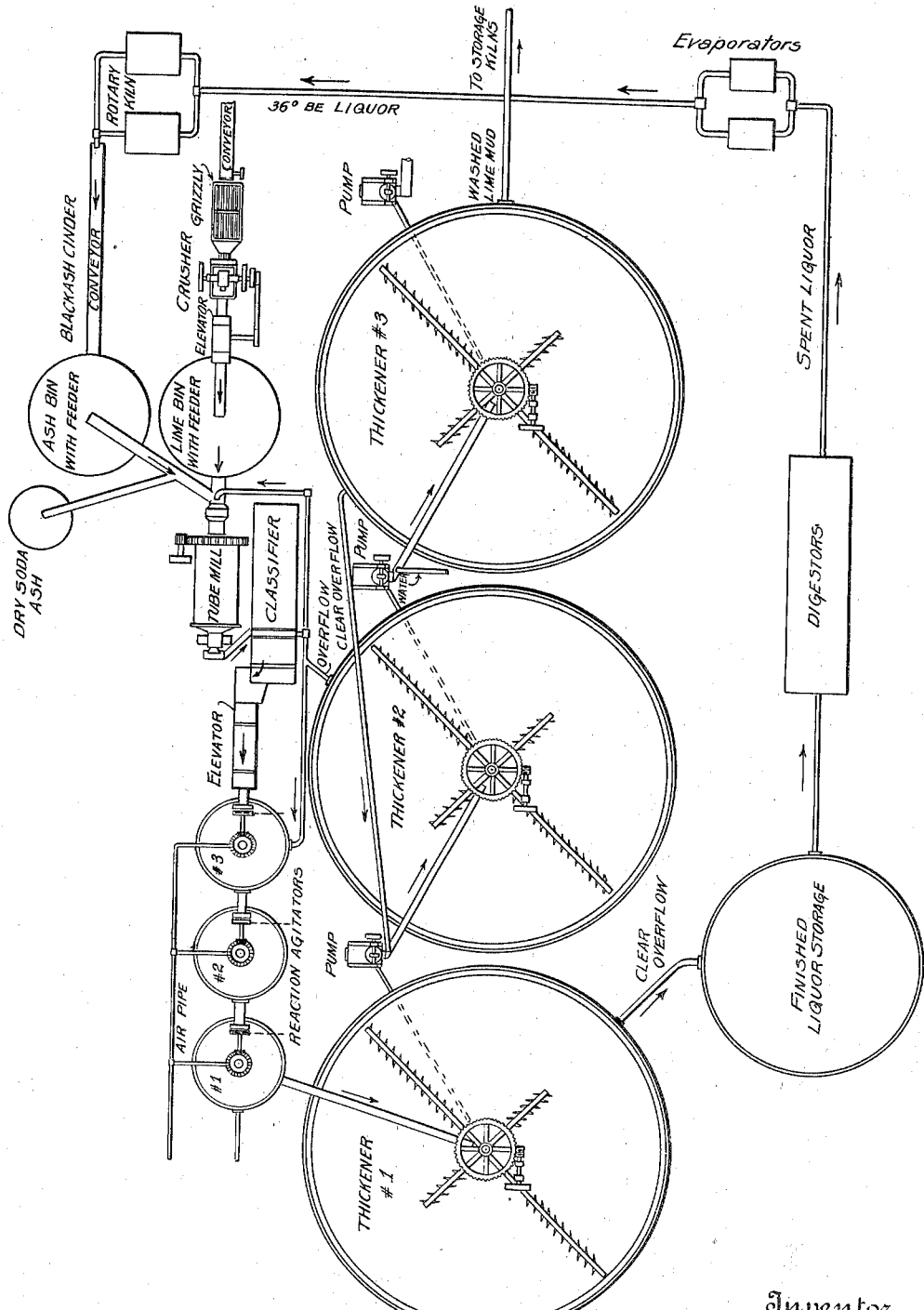

UNITED STATES PATENT OFFICE.

DANIEL SHIELDS McAFEE, OF NEW YORK, N. Y., ASSIGNOR TO THE DORR COMPANY, A CORPORATION OF DELAWARE.

PROCESS OF RECOVERING THE ALKALI USED IN PULP DIGESTION.

1,308,184.      Specification of Letters Patent.      Patented July 1, 1919.

Application filed August 16, 1918. Serial No. 250,125.

*To all whom it may concern:*

Be it known that I, DANIEL SHIELDS MC-AFEE, a citizen of the United States, residing at New York city, in the county of New York and State of New York, have invented certain new and useful Improvements in Processes of Recovering the Alkali Used in Pulp Digestion; and I do hereby declare the following to be a full, clear, and exact description of the invention, such as will enable others skilled in the art to which it appertains to make and use the same.

This invention, broadly considered, relates to the manufacture of caustic soda from soda ash and lime. More particularly it is applicable to a cyclic process in which the caustic soda used in a digesting operation, and thereby substantially neutralized, is subsequently burned to black ash cinder, the sodium carbonate content of which is again extracted and treated with lime to regenerate the caustic soda.

For example, in the soda process for making paper pulp, where the raw material, such as wood chips, cottonseed hulls, or the like, is treated in suitable digesters with the caustic soda, the non-cellulose matters of the raw material are decomposed by or combine with the caustic, and consequently the alkali is substantially all neutralized during the digesting operation. The spent liquor, resulting from the digesting operation, is evaporated to a suitable consistency, say about 36° Bé., and the concentrated liquor is then sent to a calcination furnace, usually of the rotary kiln type, from which a dry soda ash cinder, generally called black ash cinder, is recovered. This black ash cinder is treated for the recovery of the sodium content thereof, which is recausticized by means of lime to regenerate the caustic soda for subsequent use in the digesters.

The black ash cinder is composed principally of sodium carbonate, and the chemical reaction taking place by the treatment thereof with freshly slaked lime, or unslaked lime and water, is represented by the following equation:

It has heretofore been the general practice, in re-causticizing black ash cinder, to leach the cinder by percolation, after it is discharged from the calcining furnace, and to convey the liquor from this leaching operation to the lime-slaking units. Only a partial reaction between the sodium carbonate and calcium hydroxid takes place in the lime-slaking units, and the mixture is next treated in suitable reaction agitators in order to effect as complete a conversion as possible of the sodium carbonate into caustic soda.

The present invention contemplates the provision of certain improvements in processes of the character referred to, looking to a simplification and an increase in efficiency of the present practice. One aspect of the present invention involves an improvement in the method of treating the sodium carbonate content of the soda ash with lime. Thus, in accordance with this aspect of the invention, the sodium carbonate of the soda ash is subjected to the action of freshly slaked lime, or unslaked lime and a liquid lime-slaking medium, in a closed circuit grinding system, from which the sufficiently ground product is discharged as a slime and the unfinished product is returned for a further grinding treatment. In its preferred and complete aspect, however, the present invention involves the grinding of the soda ash and lime, together with a liquid lime-slaking medium, in a closed circuit grinding system. The soda ash and lime are preferably fed into this system in a dry condition, and the grinding operation effects, at one and the same time, the slaking of the lime and the leaching of the soda ash. The preliminary percolation leaching of the soda ash, such as heretofore generally practised, is thus completely eliminated. The closed circuit grinding system is preferably composed of a grinding mill, such as a tube or ball mill, and a classifier, so arranged that the discharge from the mill goes to the classifier, from which the finished product is discharged while the unfinished product is returned to the mill.

The accompanying drawing diagrammatically illustrates, by means of a conventional flow sheet, a system of apparatus for producing caustic soda, from a spent liquor in which the soda is principally present as carbonate and from lime. This system of apparatus, as illustrated, is designed for carrying out the improvements of the present invention. The various pieces of apparatus of this system are appropriately marked in the drawing, and the arrangement of the same will be understood from the following description of the use of this system for carrying out the invention.

The treatment of the raw material, such as wood pulp or the like, with caustic soda, is effected in suitable digesters, and the spent liquor is concentrated to about 36° Bé. in suitable evaporators. The product from the evaporators is conveyed to the incinerators, such, for example, as rotary kilns, and there burned to black ash cinder. The black ash cinder is then conveyed to suitable storage bins. It will, of course, be understood that this cinder may be subjected to a preliminary grinding or breaking operation, if desired.

In accordance with the improvements of the present invention, the black ash cinder is fed directly from the storage bin to the closed circuit grinding system. Associated with the soda ash storage bin is a similar storage bin for kiln lime. If desired, the lime may be preliminarily crushed before storage in its bin, and to this end the accompanying drawing illustrates a grizzly and crusher with suitable conveyers and elevators for effecting such a preliminary treatment of the lime. The same or similar preliminary treating devices may, of course, be associated with the soda ash storage bin.

The soda ash and lime are fed from their respective storage bins by suitable mechanical feed devices and in the proper proportions to a grinding mill, such, for example, as a tube or ball mill or like pulverizing device. A suitable amount of dry fresh soda ash for making up the losses incidental to the complete process is also fed to the grinding mill from a suitable storage bin therefor. In the grinding mill the soda ash and lime are ground with a suitable liquid lime-slaking medium, such, for example, as water, or wash liquor as will be more fully explained hereinafter.

A classifier is associated with the grinding mill so as to form a closed circuit grinding system. Thus, the ground mixture is discharged from the mill into the classifier and the sufficiently ground product accumulates in a sump and is conveyed in the form of a slime into suitable reaction agitators by means of an elevator, while the insufficiently ground product is returned from the classifier to the grinding mill for further reduction.

The closed circuit grinding system effects a slaking of the lime and a leaching of the soda ash cinder, and, to a certain extent, a causticizing reaction between the sodium carbonate and the calcium hydroxid. The complete causticizing reaction takes place, however, in a battery of reaction agitators, in which the discharged slime from the classifier is agitated in any suitable manner, as, for example, mechanically, or by air, or both, at a temperature of about 95° C.

The resulting solution of caustic soda is preferably separated from the residual lime mud ($CaCO_3$) by continuous counter-current decantation. Thus, in the accompanying drawing, a battery of three thickeners or pulp separators has been illustrated for this purpose. The discharge from the last reaction agitator is conveyed to the first thickener, from which the clear overflow, consisting of a solution of caustic soda, is conveyed to a suitable finished liquor storage container. The residue from the first thickener is pumped into the top of the second thickener after being mixed with the wash water from the third thickener. The dilute caustic liquor overflowing the second thickener is utilized as the liquid lime-slaking medium in the grinding mill and for diluting the slime discharged from the classifier into the reaction agitators. This wash water may also be advantageously used in the classifying operation. The pulp from the second thickener is pumped to the third thickener after mixing with fresh water, the overflow passing, as previously stated, to the pulp inlet of the second thickener. The washed lime mud from the last thickener is pumped or suitably conveyed to storage for eventual reclamation. It will, of course, be understood that more than three reaction agitators and more than three thickeners may be employed. This number has been illustrated in the drawing merely by way of example.

From the foregoing description, it will be evident that a most intimate mixture of the reacting agents is secured during the grinding operation. In the first place, the lime is ground during the slaking operation, so that fresh surfaces are constantly being exposed to the action of the slaking medium. In this manner a much more effective slaking of the lime is attained than is possible by prior methods in which the grinding action is absent. In the second place, the grinding of the soda ash cinder constantly exposes fresh surfaces thereof to the action of the solvent liquor for the sodium carbonate content thereof, whereby a more complete solution of the sodium carbonate value is attained.

The grinding operation not only assists in effectively slaking the lime, but it also slimes all insolubles so as to protect the tank systems from grit, and disintegrates and completely pulverizes the soda ash cinder, thus facilitating the solution of its sodium carbonate content. The slaked lime also partially reacts with the sodium carbonate of the soda ash during the grinding operation, and because of the greater surface of the finely divided soda ash exposed to the action of the calcium hydroxid and water, a more effective causticizing action takes place than is possible in the lime slaking units heretofore employed.

The present invention thus enables a substantially complete recovery of the sodium carbonate content of soda ash cinder even with poor burning of the cinder in the kiln. A particular advantage of the process is that it permits the addition of all fresh water at the tail end of the plant, and thus increases the washing efficiency. The invention, in its preferred aspect, does away with the installation and operating cost of the usual percolation leaching equipment, and starts the causticizing reaction at an earlier stage in the process than in prior practice. Soda ash cinder contains from about 70 to 85% of recoverable sodium carbonate, so that the increased solids, over prior practices, to be handled through the thickeners and pumps in accordance with the present invention, is practically negligible. The process of the invention enables the provision of a more compact and simple plant than has heretofore been possible, and further enables the complete elimination of one operation of the prior practice. The complete cycle of soda recovery-lime slaking causticizing and washing is made continuous, thus insuring the uniformity of the finished liquor produced and materially reducing the operating labor required.

In the slaking of the lime, water is, of course, the active lime-slaking agent. While it is generally preferable to use the wash liquor from the thickeners for slaking the lime in the grinding mill, it will, of course, be understood that any other suitable lime-slaking medium may be used, such, for example, as fresh water, a solution of sodium carbonate in water, dilute caustic soda, and so on. These and other obvious modifications of the invention will be understood by those skilled in the art, and it is the intention of the appended claims to cover all such modifications within the spirit and scope of the invention.

I claim:

1. In a cyclic process involving the recausticizing of the sodium carbonate content of soda ash cinder produced by burning the spent liquor resulting from the use of a caustic soda solution as a digesting agent, the improvement which consists in feeding unslaked lime and a liquid lime-slaking medium into a grinding mill and therein bringing the resulting slaked lime solution into contact with the soda ash cinder to be causticized and grinding the mixture, and separating the resulting solution of caustic soda from the residue; substantially as described.

2. In a cyclic process involving the recausticizing of the sodium carbonate content of soda ash cinder produced by burning the spent liquor resulting from the use of a caustic soda solution as a digesting agent, the improvement which consists in treating the soda ash cinder with slaked lime in a closed circuit grinding system from which the sufficiently ground product is discharged and the unfinished product is returned for a further grinding treatment, and separating the resulting solution of caustic soda from the residue of said discharge product; substantially as described.

3. In a cyclic process involving the recausticizing of the sodium carbonate content of soda ash cinder produced by burning the spent liquor resulting from the use of a caustic soda solution as a digesting agent, the improvement which consists in subjecting the soda ash cinder to a grinding operation, treating it during said grinding operation with slaked lime, and separating the resulting solution of caustic soda from the residue; substantially as described.

4. In a cyclic process involving the recausticizing of the sodium carbonate content of soda ash cinder produced by burning the spent liquor resulting from the use of a caustic soda solution as a digesting agent, the improvement which consists in grinding the soda ash cinder and lime in conjunction with a liquid lime-slaking agent and solvent of caustic soda, and separating the resulting solution of caustic soda from the residue; substantially as described.

5. In a cyclic process involving the recausticizing of the sodium carbonate content of soda ash cinder produced by burning the spent liquor resulting from the use of a caustic soda solution as a digesting agent, the improvement which consists in treating the soda ash cinder and lime in conjunction with a liquid lime-slaking medium in a closed circuit grinding system from which the finished product is discharged and the unfinished product is returned for further treatment, and separating the resulting solution of caustic soda from the residue; substantially as described.

6. In a cyclic process involving the recausticizing of the sodium carbonate content of soda ash cinder produced by burning the spent liquor resulting from the use of a caustic soda solution as a digesting agent, the improvement which consists in grinding a mixture of the soda ash cinder and lime and slaking the lime during the grinding operation, agitating the ground mixture with a solvent of caustic soda, and separating the resulting solution of caustic soda from the residue; substantially as described.

7. In a cyclic process involving the recausticizing of the sodium carbonate content of soda ash cinder produced by burning the spent liquor resulting from the use of a caustic soda solution as a digesting agent, the improvement which consists in grinding the soda ash cinder and lime in conjunction with a liquid lime-slaking medium and solvent of caustic soda, discharging the sufficiently ground product of said grinding operation and returning the unfinished product thereof for a further grinding treatment, agitating said discharge product to complete the causticizing of said soda ash cinder, and separating the resulting solution of caustic soda from the residue; substantially as described.

8. In a cyclic process involving the recausticizing of the sodium carbonate content of soda ash cinder produced by burning the spent liquor resulting from the use of a caustic soda solution as a digesting agent, the improvement which consists in grinding unslaked lime with a liquid lime-slaking agent, bringing the sodium ash cinder to be causticized into contact therewith during the grinding operation, discharging the sufficiently ground product of said grinding operation and returning the unfinished product for a further grinding treatment, and separating the resulting caustic soda from said discharge product; substantially as described.

9. The process of causticizing soda ash which comprises grinding unslaked lime with a liquid lime-slaking agent, and bringing the sodium carbonate of the soda ash to be causticized into contact therewith during said grinding operation; substantially as described.

10. The process of causticizing soda ash which comprises subjecting the soda ash to a grinding operation, treating the soda ash during said grinding operation with slaked lime, and separating the resulting solution of caustic soda from the residue; substantially as described.

11. The process of causticizing soda ash with lime which comprises grinding soda ash and lime in conjunction with a liquid lime-slaking agent and solvent of caustic soda, and separating the resulting solution of caustic soda from the residue; substantially as described.

12. The process of causticizing soda ash with lime which comprises treating soda ash and lime in conjunction with a liquid lime-slaking medium in a closed circuit grinding system from which the finished product is discharged and the unfinished product is returned for further treatment, and separating the resulting solution of caustic soda from the residue; substantially as described.

13. The process of producing caustic soda from soda ash and lime which comprises grinding and simultaneously slaking the lime, bringing the sodium carbonate of the soda ash into contact with the lime during said grinding operation, and separating the resulting solution of caustic soda from the residue; substantially as described.

14. The process of causticizing soda ash which comprises grinding a mixture of soda ash and lime and slaking the lime during the grinding operation, agitating the ground mixture with a solvent of caustic soda, and separating the resulting solution of caustic soda from the residue; substantially as described.

15. The process of causticizing soda ash with lime which comprises grinding soda ash and lime in conjunction with a liquid lime-slaking medium and solvent of caustic soda, discharging the sufficiently ground product of said grinding operation and returning the unfinished product thereof for a further grinding treatment, agitating said discharged product to complete the causticizing of said soda ash, and separating the resulting solution of caustic soda from the residue; substantially as described.

16. The process of causticizing soda ash which comprises grinding unslaked lime with a liquid lime-slaking agent, bringing the sodium carbonate to be causticized into contact therewith during the grinding operation, discharging the sufficiently ground product of said grinding operation and returning the unfinished product for a further grinding treatment, and separating the resulting caustic soda from said discharge product; substantially as described.

17. The process of causticizing soda ash which comprises grinding soda ash and lime in conjunction with a liquid lime-slaking medium and solvent of caustic soda, subjecting the ground product to a classifying operation from which slime is discharged and a residue is returned for a further grinding operation, and separating the resultant caustic soda from said slime; substantially as described.

In testimony whereof I affix my signature.

DANIEL SHIELDS McAFEE.